Figure 1:
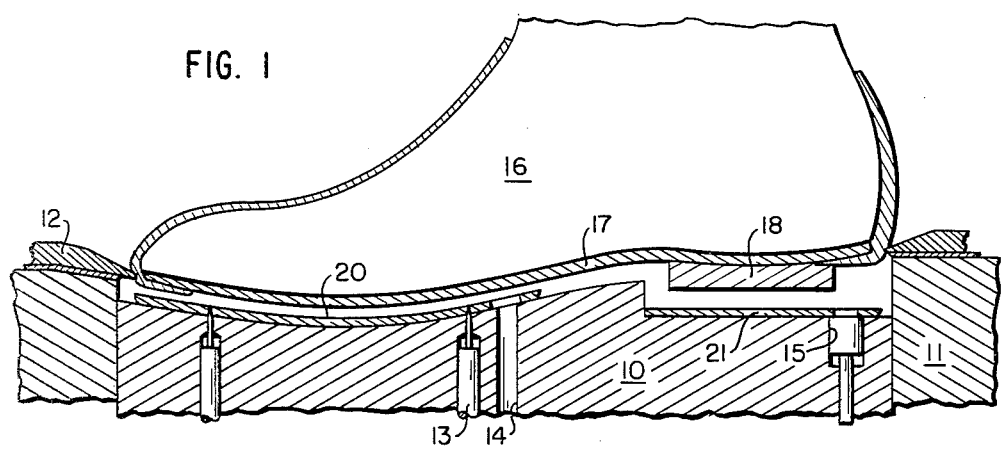

April 12, 1966   J. J. FERREIRA   3,246,068
INJECTION MOLDED SHOE BOTTOM
Original Filed April 12, 1962

INVENTOR.
JOSEPH J. FERREIRA
BY Kenway, Jenney & Hildreth
ATTORNEYS

United States Patent Office 3,246,068
Patented Apr. 12, 1966

3,246,068
INJECTION MOLDED SHOE BOTTOM
Joseph J. Ferreira, Raynham, Mass., assignor to Joseph F. Corcoran Shoe Co., Inc., Stoughton, Mass., a corporation of Massachusetts
Original application Apr. 12, 1962, Ser. No. 187,050, now Patent No. 3,116,566, dated Jan. 7, 1964. Divided and this application May 9, 1963, Ser. No. 279,165
4 Claims. (Cl. 264—244)

This application is a division of my co-pending application Serial No. 187,050, filed April 12, 1962, now Letters Patent No. 3,116,566 dated January 7, 1964, and containing claims to the products.

This invention carries into a new field the now-popular injection process of molding soles or shoe bottoms. It provides an injection process for incorporating in the tread of the shoe leather sole pieces, such as full soles, taps, heel lifts or other inserts. Thus shoes which have heretofore been restricted to treads of PVC or other plastic material may now be offered to wearers who insist or prefer to walk on sole leather.

The injection process as heretofore practiced is characterized by forming a mold cavity of which the lasted shoe bottom is one component and a spaced sole mold is another. Then PVC or other plastic is injected in fluid form into this cavity so that an outsole of finished contour is molded directly upon the shoe bottom. The sole molded in this manner is an integral piece of plastic composition extending continuously from toe to heel with finished side edges, imitation wheeled welt margin, and embossed tread surface. A machine designed for carrying out this injection process is fully described in United States Letters Patent 3,006,032 October 31, 1961.

I have discovered that by properly placing and securing in position a preformed leather sole piece upon the inner surface of the sole mold, the injection step may now be carried out with the result that the leather sole piece becomes fully incorporated in the molded sole in flush relation therewith and permanently bonded in place in the shoe bottom. The plastic material will be found to form a continuous layer or ply or mid-sole between the leather sole piece and the shoe bottom and also to form a continuous band about the marginal edges of the sole piece. The sole piece is thus fully exposed and may be boned or otherwise ornamented in the manner of high grade leather soles. At least the plastic part of the exposed margin of the composite sole formed in this manner is finished in shape and surface texture.

Where a leather tap is employed it is often desirable to provide rivets or other fasteners at the rear or shank edge of the tap to reinforce the sole adjacent to the ball line.

A more specific feature of the invention consists in employing a full length sole piece extending rearwardly to at least the heel breast line thus anchoring the inserted sole piece securely beneath the heel with leverage action.

The process of this invention is to be distinguished from any process of vulcanization in that it successfully deals with commercially available or standard sole leather whereas such leather is seriously impaired in quality if subjected to the higher temperature required for vulcanization.

These and other features of the invention will be best understood and appreciated from the following description of a preferred manner of carrying it out, as shown in the accompanying drawings, in which—

Figure 2:
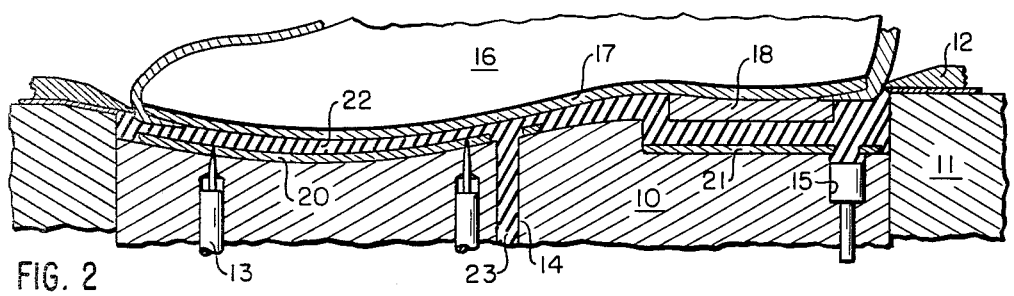
Figure 3:
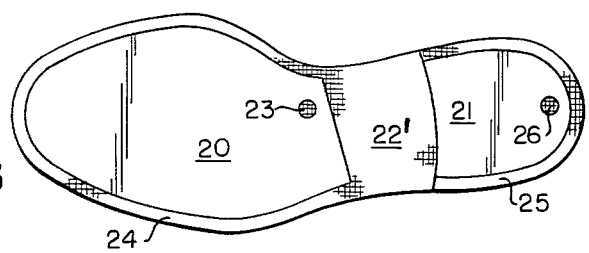
Figure 4:
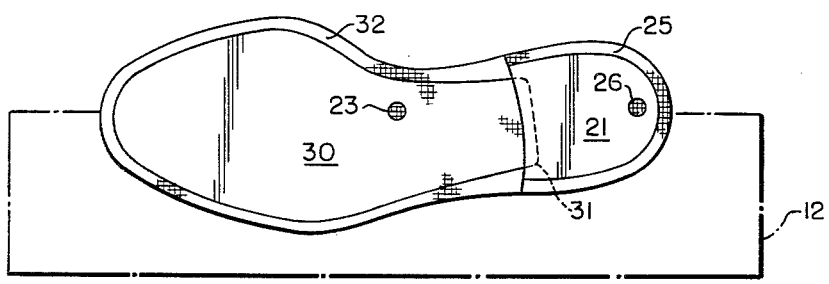

FIG. 1 is a view in longitudinal section of a lasted shoe and mold preparatory to the injection step, FIG. 2 is a similar view showing the injection step completed, FIG. 3 is a plan view of a sole produced in accordance with FIGS. 1 and 2, and FIG. 4 is a plan view of a shoe bottom in which a full leather sole piece is incorporated.

As shown in FIGS. 1 and 2 the mold as a whole comprises a bottom mold component 10 and cooperating side molds 11 to which are secured inwardly beveled welt plates 12. The bottom mold 10 has a continuous surface for forming the tread face and shank portions of the sole and this may be embossed, knurled or otherwise fashioned to impart an ornamental texture to the injected plastic material wherever contacted by it. The rear end of the bottom mold 10 is herein shown as shaped to mold the sole with an integral heel and this may be of any desired height or shape.

The first step of my process consists in placing and securing a perforated sole piece, such as the tap 20, upon the forepart of the bottom mold 10. It is important that the sole piece should be held in fixed position against the possibility of being displaced in the mold by the flow of the injected plastic in fluid state under substantial pressure.

As herein shown the bottom mold is provided with two or more bores for plungers 13 carrying sharp spurs that may be driven into the tap 20 and so hold it in the desired predetermined position, that is to say, symmetrically with respect to the contour of the forepart of the sole, with a uniform marginal spacing and with its rear edges adjacent the shank portion thereof. The precise manner of holding the tap or leather sole in place is of secondary importance. Clamping devices or edge gauges or adhesive could be employed within the scope of the invention for that purpose.

The sole mold 10 is provided with an inlet passage 14 which is located approximately mid-way between the toe and heel ends of the mold. It also has an outlet passage or "tell-tale" 15 at its heel and through which air from the closed mold may be exhausted to the atmosphere during the injection step. The mold 10 also has a rearwardly facing transverse shoulder located at approximately the heel breast line.

The mold cavity is completed by the lasted shoe bottom which is herein shown as presented on the last 16 and includes a conventional insole 17 and heel lift 18. It will be understood that the margin of the upper is lasted to the lower face of the insole as shown in FIG. 1 and permanently secured thereto by lasting tacks or cement. The side molds 11 are closed together and meet in the longitudinal axis of the sole at the toe and heel ends thereof. The welt plates 12 engage the side walls of the lasted upper in position to form a welt line or shoulder about the sole. In the present instance a leather top lift 21 is placed in the heel cavity of the mold and this may be preliminarily secured in position by adhesive or other means.

Having prepared the mold cavity as above explained the plastic compound in fluid state is injected under pressure through the inlet passage 14 of the mold member 10 and through the hole in the sole piece provided for that purpose and located therein so as to register with the inlet passage 14. As it flows into the mold cavity it forms a continuous layer or mid-sole 22 between the tap or sole piece 20 and the insole 17 and also a thicker marginal band 24 surrounding the side edges of the tap. It also forms the shank portion 22', which will have substantially the same thickness as the combined plies 20 and 22, and forms part of the heel body and a marginal band 25 about the top lift 21. It will be observed that the edges of the tap and top lift are somewhat beveled in order to increase the anchorage effect of overlapping plastic compound.

The injection step continues until the mold cavity is completely filled with hot plastic compound and a sprue 23 formed in the inlet passage 14 and in the registering hole in the sole piece. A sprue is also formed in the tell-tale passage 15. The injected compound is then held under conditions of pressure and allowed to cool until fully cured. This may require an interval of three to five minutes and in this step a bond is formed between all the assembled parts that will outlast the normal life of the shoe. When the mold is opened the bottomed shoe may be removed and the sprues cut off flush with the exposed tread surfaces of the sole piece and top lift 21, at 23 and 26 in FIG. 3.

A plastic compound well suited for the described process is polyvinyl chloride, herein referred to as PVC, and this may be plasticized to develop a more or less rubbery texture and to be compatible with the cement coating usually applied to the insole 17. My novel process is not, however, limited to the employment of PVC but may be carried out with other vinyl or synthetic resinous compounds having equivalent properties.

As above stated it is contemplated that if desired headed fasteners may be inserted near the rear edge of the tap 20 to reinforce the bond in this particular location. Efficient reinforcing may also be secured, as suggested in FIG. 4, by employing a leather sole piece 30 having a shank extension 31 that projects rearwardly to or beyond the heel breast line where it is securely anchored beneath or adjacent to the molded heel and in a part of the shoe bottom not subjected to bending in wear.

In FIG. 3 of the drawings the sole piece is represented as the tap 20 shaped to occupy the forepart of the sole within a well defined margin. A commercially preferred form of sole piece 30 with shank extension 31 is shown in FIG. 4. It is contemplated, however, that sole pieces of other shapes may be employed consistent with the style of the shoe to be manufactured. When a full length sole is employed the marginal band of PVC substantially covers it except as it may be seen from the edge of the shoe bottom. While the sole piece 20 and top lift has been referred to as consisting of sole leather any other material may be employed that is suitable for insertion in the tread surface of the sole.

The location of the injection inlet passages 14 and the registering hole in the leather sole piece in a mid-position with respect to the shoe bottom is desirable and important to the successful practice of the novel process herein disclosed and claimed in that the path of flow of the injected PVC is thus reduced by a minimum. It is at no point more than one-half the length of the shoe bottom and therefore requires less time than if, for example, it were injected from the heel end of the mold. Moreover in this centralized flow the PVC does not encounter as an obstacle the transverse shoulder of the bottom mold at the heel breast line.

Having thus disclosed my invention and described in detail an illustrative embodiment thereof I claim as new and desire to secure by Letters Patent;

1. The process of injection molding shoe bottoms, characterized by the steps of forming a mold of which the lasted shoe bottom is a part, fastening a leather sole blank in spaced predetermined relation with respect to the shoe bottom, and then injecting fluid PVC through a hole in the sole blank thereby filling the space between the sole blank and shoe bottom thus bonding the leather sole blank to the lasted shoe bottom and surrounding the marginal edges of said blank.

2. The process of forming finished shoe bottoms by injection molding, characterized by the step of locating a leather sole piece accurately in predetermined and spaced away position with respect to the bottom and insole of a lasted shoe, then injecting fluid PVC through a hole in the sole piece causing it to form a mold-finished band about the marginal edges of the sole blank and thus permanently incorporating the sole blank in the shoe bottom and bonding it to the insole.

3. The process of forming an integral, flush-faced sole for a shoe, comprising the steps of locating a leather sole piece on a smooth mold surface spaced from the lasted shoe bottom, and then injecting fluid resinous compound through a hole in the leather sole piece and into a closed mold cavity of which the shoe bottom constitutes one component thus bonding the sole piece to the lasted shoe bottom and providing the sole piece with a mold-finished marginal band of resinous compound.

4. The process of injection molding shoe bottoms which includes the steps of forming a mold of which a lasted shoe bottom and insole constitutes one member and a preformed leather sole piece disposed in spaced away relation thereto constitutes another mold member, then injecting a hot fluid curable plastic compound through a hole in the sole piece and into the space between the two said mold members, causing the plastic compound to flow and form an intermediate bonding mid-sole which is coextensive with the said leather sole piece, and maintaining the compound until cured under pressure between the mold members thus bonding the sole piece to the lasted shoe bottom and providing the sole piece with a marginal band of plastic compound.

References Cited by the Examiner

UNITED STATES PATENTS

| | | | |
|---|---|---|---|
| 2,607,061 | 8/1952 | Leahy et al. | 18—59 |
| 2,794,270 | 6/1957 | Dubner. | |
| 2,799,034 | 7/1957 | Crowell et al. | 18—59 |
| 3,026,573 | 3/1962 | Ciaio | 18—59 |

FOREIGN PATENTS

| | | |
|---|---|---|
| 1,016,468 | 8/1952 | France. |
| 840,839 | 7/1960 | Great Britain. |
| 491,208 | 2/1954 | Italy. |

ROBERT F. WHITE, *Primary Examiner.*

ALEXANDER H. BRODMERKEL, *Examiner.*